Patented Nov. 23, 1948

2,454,409

UNITED STATES PATENT OFFICE 2,454,409

MANUFACTURE OF SULFUR COMPOUNDS

Walter A. Schulze and Willis W. Crouch, Bartlesville, Okla., assignors to Phillips Petroleum Company, a corporation of Delaware No Drawing. Application October 19, 1943, Serial No. 506,902

8 Claims. (Cl. 260—609)

This invention relates to an improved process for the manufacture of organic sulfur compounds. In a specific embodiment, this invention relates to the direct addition of a compound having the formula RSH, in which R represents hydrogen or an organic radical substantially inert under the reaction conditions used, to an ethylenic linkage in an organic compound, in the presence of a novel catalyst to produce mercaptans and/or organic sulfides. A more specific and preferred embodiment involves the manufacture of useful mercaptans from olefins and hydrogen sulfide through the agency of a hydrogen fluoride catalyst, and the invention will be described in detail with particular reference to this embodiment.

The direct synthesis of organic sulfur compounds, especially mercaptans and sulfides (thioethers) by the addition of hydrogen sulfide or mercaptans to olefinic materials, with or without the presence of a catalyst, has been reported by various investigators. However, the specificity of these reactions has not been of the order frequently desired, due to the elevated temperatures employed and/or lack of activity or specific action of the catalysts proposed.

An object of this invention is to manufacture organic sulfur compounds.

Another object is to effect catalytically the addition of (a) hydrogen sulfide or (b) mercaptans, to olefinic materials, to produce (a) mercaptans and/or sulfides or (b) sulfides, respectively.

Another object of this invention is to manufacture valuable mercaptans such as those containing from 2 to about 12 or more carbon atoms per molecule, through the interaction of selected olefins or olefin mixtures with hydrogen sulfide in the presence of an anhydrous or aqueous hydrogen fluoride catalyst.

A further object of this invention is to provide a process for mercaptan manufacture under controlled conditions whereby reaction between the olefin and hydrogen sulfide can be effected with virtually no decomposition or isomerization of the product.

Another object of the invention is to effect the direct addition of hydrogen sulfide to aliphatic, substituted aliphatic, and cyclic olefins to yield the corresponding mercaptan derivatives.

An additional object of the present invention is to carry out the interaction of olefinic hydrocarbons and hydrogen sulfide to produce mercaptans in the presence of a diluent in order that long catalyst life and maximum catalyst recovery may be realized.

Further objects and advantages of the invention will be apparent, to one skilled in the art, from the accompanying disclosure and discussion.

We have discovered that the sulfur-compound-forming reactions referred to above are smoothly and efficiently accomplished in the presence of anhydrous or concentrated aqueous solutions of hydrogen fluoride. Moreover, we have found that the process is operable at relatively low temperatures to give a high conversion of the olefinic material to the desired corresponding sulfur compounds, due to the high activity and specificity of our preferred catalyst.

Our novel and active catalyst may be applied to the reaction between mercaptans and olefinic hydrocarbons to produce sulfides. It may also be applied to the reaction between $H_2S$ and olefins to produce mercaptans as herein discussed. While in the latter reaction some formation of sulfides may be expected due to a secondary reaction between the product mercaptan and the olefin, or to other factors, it has been found in practice that such sulfide formation may be kept to a desired low and even negligible value by maintaining a substantial excess of $H_2S$ in the reaction zone and/or by operating at moderate temperatures which are still adequate for effecting the addition of $H_2S$ to olefins. On the other hand, when it is desired to produce sulfides as the product of an olefin-$H_2S$ reaction, the yield of sulfides may be materially increased by suitable control of reaction conditions, as by operating with higher olefin:$H_2S$ ratios. In any case, the activity of our catalyst makes possible the carrying out of the chosen reaction under moderate conditions which enable control of product to an exceptionally advantageous degree.

The process of the present invention comprises in preferred embodiment the contacting of controlled proportions of olefinic hydrocarbon, or olefinic hydrocarbon mixtures, and hydrogen sulfide or mercaptan with a liquid catalyst comprising anhydrous or concentrated aqueous hydrogen fluoride, under conditions selected to produce a substantial conversion of olefinic hydrocarbon to the corresponding mercaptan or sulfide, as the case may be. For example, in the case of the mercaptan-forming reaction, the hydrocarbon-hydrogen sulfide feed mixture may be passed continuously through a reactor wherein it is thoroughly contacted with the hydrogen fluoride catalyst, and the resulting effluent stream may be either continuously or intermittently fractionated to separate hydrogen sulfide, catalyst, and any unreacted hydrocarbons from the product.

In a specific preferred embodiment of the invention an olefin feed stock, such as diisobutylene, is diluted with n-pentane to prepare a hydrocarbon blend containing about 20 per cent by weight of the olefinic component. The reactor feed is completed by the addition of enough hydrogen sulfide to give an H₂S/olefin mol ratio of from about 1.5:1 to about 3:1. The reaction mixture is continuously charged to a reaction zone where it is thoroughly agitated with substantially anhydrous hydrogen fluoride. Agitation may be accomplished by mechanical stirring, or by introduction of the feed into the catalyst through a plurality of jets or mixing nozzles, or by any other suitable means. The emulsion from the reaction zone continuously passes into a settling tank where the catalyst layer is separated and returned to the reactor. The reaction pressure is ordinarily maintained at about 150 pounds gage for this particular system, while the temperature is maintained at about 75 to 80° F. The excess hydrogen sulfide is recovered in the stabilization operation for subsequent re-blending with the reactor feed. The pentane is removed from the product stream by fractionation at atmospheric pressure. The final fractionation to separate the octyl mercaptan from unreacted diisobutylene is carried out under diminished pressure.

Suitable catalysts for this invention comprise concentrated hydrogen fluoride, that is anhydrous hydrogen fluoride or aqueous solutions containing at least about 50 weight per cent hydrogen fluoride. Ordinarily it is preferred to operate the process with essentially anhydrous acid because of its greater catalytic activity and lower corrosion rate against metal equipment.

Feed stocks operable in the present invention have at least one ethylenic linkage, may comprise pure single olefinic hydrocarbons or mixtures of olefinic hydrocarbons derived from any suitable source, and may include the following types: aliphatic olefins containing from 2 to 14 or more carbon atoms per molecule; substituted olefins in which one or more hydrogen atoms have been replaced by organic or inorganic substituents, other than alkyl radicals, which do not interfere with the principal reaction; cyclic olefins such as cyclohexene and its homologs; substituted cyclic olefins. Refinery gases from thermal or catalytic cracking units may be employed as a suitable source of low molecular weight olefins, while the products from catalytic polymerization units may furnish a wide variety of high molecular weight olefins. Cyclic olefins and certain substituted olefins such as styrene and its homologs may be derived from catalytic or thermally cracked distillates, or from other more specialized synthetic operations.

The hydrogen sulfide may be obtained from any convenient source. It is particularly abundant as a by-product from petroleum refining processes and from natural gasoline treating plants. Pure hydrogen sulfide, while often desirable, is not essential to the successful operation of this invention.

The mercaptan synthesis of the present invention may be carried out with strictly olefinic feed stocks, or with olefins admixed with non-olefinic material such as might be encountered in the employment of refinery cracking still gases. In many instances it is often desirable to reduce the olefin content of the charge by the addition of an inert liquid hydrocarbon diluent, such as saturated hydrocarbons of selected boiling range, in order to aid in temperature control, to facilitate the separation of catalyst from the product stream, and to permit operation with adequate hydrogen sulfide concentration at moderate pressures. In many instances the viscosity and gravity of the mercaptan product is such that incomplete separation of the catalyst from the product prevails unless a suitable diluent is employed in the reaction mixture. The amount of diluent employed may for example, vary from 1 mol of diluent per mol of olefin to about 15 or more mols of diluent per mol of olefin, although the preferred ratio ordinarily varies between about 5 and 10.

In the operation of this process to produce mercaptans, it is important that a molal excess of hydrogen sulfide be present in the reaction zone at all times in order to suppress the strong polymerizing and/or depolymerizing activity of hydrogen fluoride toward the olefin feed. Ordinarily a hydrogen sulfide-olefin mol ratio of 2 is quite satisfactory, although variations from ratios slightly greater than 1 to about 5 may be necessary, depending on the particular mercaptan synthesis involved.

Because of the high degree of activity displayed by the preferred catalysts, substantially atmospheric temperatures, such as from about 32 to about 150° F., may be employed. However, the preferred operating temperatures are more often selected from the approximate range 75–100° F. In the synthesis of mercaptans containing more than 10 carbon atoms, a more moderate temperature range of from about 32 to about 75° F. may be especially advantageous in order to prevent depolymerization of the olefin and fragmentation of the product mercaptans.

Reaction pressures are preferably selected so as to maintain a liquid- or dense-phase condition in the reaction zone. The selected pressures may range from low superatmospheric pressures of about 100 pounds per square inch to about 1000 pounds per square inch depending on the nature of the olefin, the quantity of diluent, and the mol ratio of hydrogen sulfide to olefin. Pressures from about 100 to about 500 pounds gage are ordinarily satisfactory.

The volume ratio of liquid reactants to catalyst in the reaction zone may vary from about 1 to 10, with an intermediate range of about 4 to 8 being preferred.

Flow rates to the reactor are adjusted to give an average residence time of about 20 minutes, although higher and lower values may be employed depending on the activity of the olefin employed.

In order to illustrate further the specific uses and advantages of the present invention, the following exemplary operations will be described. However, since these and numerous other process modifications will be obvious in the light of the present disclosure, no undue limitations are intended.

*Example I*

A hydrocarbon blend containing 11.5 weight per cent diisobutylene in n-pentane was employed as the hydrocarbon feed stock for this mercaptan synthesis. The general procedure involved the continuous passage of the hydrocarbon-hydrogen sulfide blend through a reaction zone in which the reactants were thoroughly contacted with liquid anhydrous hydrogen fluoride. The catalyst was continuously separated from the reactants and returned by gravity flow to the reaction zone, while the effluent stream was processed for recovery of the mercaptan products. Reaction conditions were as follows:

| | |
|---|---|
| $H_2S$:olefin, mol ratio | 2.5 |
| Hydrocarbon:hydrogen fluoride, vol. ratio | 6.3 |
| Reaction temperature, °F | 75–80 |
| Pressure, p. s. i. g | 100 |
| Hydrocarbon residence time in reactor, minutes | 20 |

Excess hydrogen sulfide, n-pentane diluent, and dissolved catalyst were removed from the total effluent in a stabilizing operation. The crude mercaptan product was then fractionally distilled under 200 mm. Hg pressure to prepare the final octyl mercaptan. Approximately 90 per cent by weight of the diisobutylene was converted to mercaptan products, of which 80 per cent was octyl mercaptans and the remaining 20 per cent was mainly butyl mercaptan isomers. Sulfur analysis of the octyl mercaptan fraction indicated a mercaptan content of 97 weight per cent.

Example II

A hydrocarbon feed comprising about 12 weight per cent triisobutylene in a 200–250° F. fraction of natural gasoline was charged along with hydrogen sulfide to a metal reactor containing 80 per cent aqueous hydrofluoric acid as the catalyst. The reaction was carried out as a continuous process with the catalyst being recycled to the reaction zone. Operating conditions are listed in the subjoined tabulation:

| | |
|---|---|
| $H_2S$:olefin, mol ratio | 3.0 |
| Hydrocarbon:hydrofluoric acid, vol. ratio | 4.8 |
| Reaction temperature, °F | 75–80 |
| Pressure, p. s. i. g | 120 |
| Residence time in reactor, minutes | 25 |

After removal of hydrogen sulfide, dissolved hydrofluoric acid, and diluent, the remaining crude product was fractionally distilled under diminished pressure. About 10 weight per cent of the triisobutylene was recovered unreacted, while 80 weight per cent of the converted triisobutylene was recovered as $C_{12}$ mercaptans. About 20 per cent of the converted charge was found in the form of octyl and butyl mercaptans. The sulfur content of the high-boiling $C_{12}$ fraction indicated a mercaptan content of 97.5 weight per cent.

The $C_{12}$ mercaptan mixture, thus prepared, was found to impart desirable properties to Buna-N type synthetic rubber when employed as a modifying agent.

Example III

Secondary butyl mercaptan was prepared in a continuous reaction from butene-2 and hydrogen sulfide in the presence of anhydrous hydrogen fluoride. The hydrocarbon charge to the reaction comprised 20 weight per cent butene-2 in n-pentane. Sufficient pressure was used to dissolve the desired amount of hydrogen sulfide in the liquid charge. The reaction conditions are given in the following tabulation:

| | |
|---|---|
| $H_2S$:butene, mol ratio | 3.0 |
| Hydrocarbon:HF, vol. ratio | 5.4 |
| Reaction temperature, °F | 80–85 |
| Pressure, p. s. i. g | 150 |
| Residence time in reactor, minutes | 20 |

The raw effluent was stabilized to remove $H_2S$ and butene-2, and traces of catalyst were removed by agitation with dilute caustic solution. The dried stabilized material was fractionated to remove pentane diluent and to prepare a mercaptan fraction boiling from 182 to 186° F. Approximately 95 per cent of the depentanized product distilled in the range of secondary butyl mercaptan. Assuming the kettle product to be mainly polymerized butene, the material balance indicated that about 7 per cent of the butene-2 charge passed through the reaction zone unconverted.

The sec-butyl mercaptan may be employed as an intermediate in the synthesis of pharmaceutical preparations.

Example IV

Cyclohexyl mercaptan was prepared by continuously contacting a solution containing 11 weight per cent cyclohexene, 16 weight per cent hydrogen sulfide, and 73 weight per cent n-pentane with liquid anhydrous hydrogen fluoride as the catalyst. The reaction conditions are listed below:

| | |
|---|---|
| $H_2S$:cyclohexene, mol ratio | 3.5 |
| Hydrocarbon:HF, vol. ratio | 5.4 |
| Reaction temperature, °F | 90–100 |
| Pressure, p. s. i. g | 125 |
| Residence time, minutes | 22 |

The effluent from the reactor was weathered and heated to expel excess hydrogen sulfide and traces of hydrogen fluoride catalyst. The crude product was then depentanized and finally fractionated under a pressure of 125 mm. of mercury. Approximately 83 per cent of the cyclohexene-free product boiled at 208–215° F. (125 mm.), which along with other physical constants indicated the formation of cyclohexyl mercaptan. Approximately 6.5 weight per cent of the olefin charge was recovered unreacted. The high-boiling residue, amounting to 13 per cent of the crude product, was mainly polymerized cyclohexene. Analysis for mercaptan sulfur in the product fraction indicated a purity of 95 per cent cyclohexyl mercaptan.

Although the invention has been described in detail with particular reference to preferred modifications, it will be appreciated that the process may be effected in manners other than those described. Various alternative operations will be apparent to one skilled in the art in view of the instant disclosure, and the invention is accordingly to be limited only by the accompanying claims.

We claim:

1. A process for synthesizing mercaptans which comprises contacting a reaction feed whose sole reactive components consist of hydrogen sulfide and at least one olefinic hydrocarbon, with a liquid catalyst comprising concentrated hydrofluoric acid containing at least 50 weight per cent hydrogen fluoride, at a temperature within the range of 32 to 100° F. and for a contact time not exceeding about 25 minutes, and maintaining in the reaction zone at all times a molal excess of hydrogen sulfide over the olefin with an $H_2S$:olefin mol ratio between about 1 and about 5 suppressing secondary reactions, thereby producing a resultant reaction mixture containing the mercaptan product resulting from addition of hydrogen sulfide to said olefinic hydrocarbon in quantities in substantial excess of the quantity of any unreacted olefin plus any secondary products.

2. A continuous process for converting hydrogen sulfide and an olefin into the corresponding mercaptan in high yield with a high per-pass conversion, which comprises continuously passing into a reaction zone a liquid feed consisting of a saturated hydrocarbon diluent, an olefin, and sufficient hydrogen sulfide dissolved therein under a pressure of from about 100 to about 1000 pounds per square inch to provide a molal excess of hydrogen sulfide to olefin in said feed and in the reaction zone at all times, continuously passing into said reaction zone a liquid catalyst comprising concentrated hydrofluoric acid containing at least about 50 weight per cent hydrogen fluoride in such amount that a volume ratio of liquid reactants to catalyst of from about 4 to about 8 is maintained in the reaction zone, agitating thoroughly the liquids within the reaction zone to form an emulsion, maintaining the reaction mixture within the reaction zone for a residence time of from about 20 to about 25 minutes at temperatures within the range of about 32 to about 100° F. and at pressures within the range of about 100 to about 1000 pounds per square inch, to effect conversion of at least most of said olefin to the corresponding mercaptan by catalytic addition of hydrogen sulfide to the olefinic bond thereof with a minimum of secondary reactions, continuously withdrawing the emulsion from said reaction zone and allowing a catalyst layer to settle therefrom, returning said catalyst layer to the reaction zone, recovering the unreacted hydrogen sulfide and returning same to admixture with the feed, and recovering from admixture with diluent the mercaptan product of the process.

3. The method of preparing mercaptans by direct addition reaction of hydrogen sulfide with olefins in the substantial absence of other reactions, which consists in contacting an initial liquid reaction mixture consisting of at least one olefin, hydrogen sulfide, and an inert liquid hydrocarbon diluent, in a ratio of from 1.5 to 3 mols hydrogen sulfide per mol of olefin and a ratio of from 1 to 15 mils diluent per mol of olefin, with a liquid catalyst comprising substantially anhydrous hydrogen fluoride, at a temperature sufficiently low and a contact time sufficiently short to effect substantially only the formation of mercaptan, and recovering the thus-synthesized mercaptan as the product of the process.

4. The process of claim 1 in which said olefinic hydrocarbon is an aliphatic mono-olefin.

5. The process of claim 1 in which said olefinic hydrocarbon is a butene.

6. The process of claim 1 in which said olefinic hydrocarbon is a cyclo-olefin.

7. The process of claim 1 in which said olefinic hydrocarbon is a cyclohexene.

8. The process of claim 1 in which said olefinic hydrocarbon is a $C_{12}$ olefin.

WALTER A. SCHULZE.
WILLIE W. CROUCH.

REFERENCES CITED

The following references are of record in the file of this patent:

UNITED STATES PATENTS

| Number | Name | Date |
| --- | --- | --- |
| 1,836,170 | Johansen | Dec. 15, 1931 |
| 1,836,171 | Johansen | Dec. 15, 1931 |
| 1,836,183 | Johansen | Dec. 15, 1931 |
| 2,051,807 | Allen | Aug. 25, 1936 |
| 2,052,268 | Williams | Aug. 25, 1936 |
| 2,101,096 | Reuter | Dec. 7, 1937 |
| 2,211,990 | Shoemaker | Aug. 20, 1940 |
| 2,252,138 | Rutherford | Aug. 12, 1941 |
| 2,275,312 | Tinker | Mar. 3, 1942 |
| 2,296,399 | Otto | Sept. 22, 1942 |
| 2,352,435 | Hoeffelman | June 27, 1944 |
| 2,366,453 | Meadow | Jan. 2, 1945 |

FOREIGN PATENTS

| Number | Country | Date |
| --- | --- | --- |
| 532,676 | Great Britain | Jan. 29, 1941 |

Certificate of Correction

Patent No. 2,454,409.

November 23, 1948.

WALTER A. SCHULZE ET AL.

It is hereby certified that errors appear in the printed specification of the above numbered patent requiring correction as follows:

Column 3, line 24, for "80° F." read *85° F.*; column 7, line 42, claim 3, for "15 mils" read *15 mols*;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*